Figure 1:
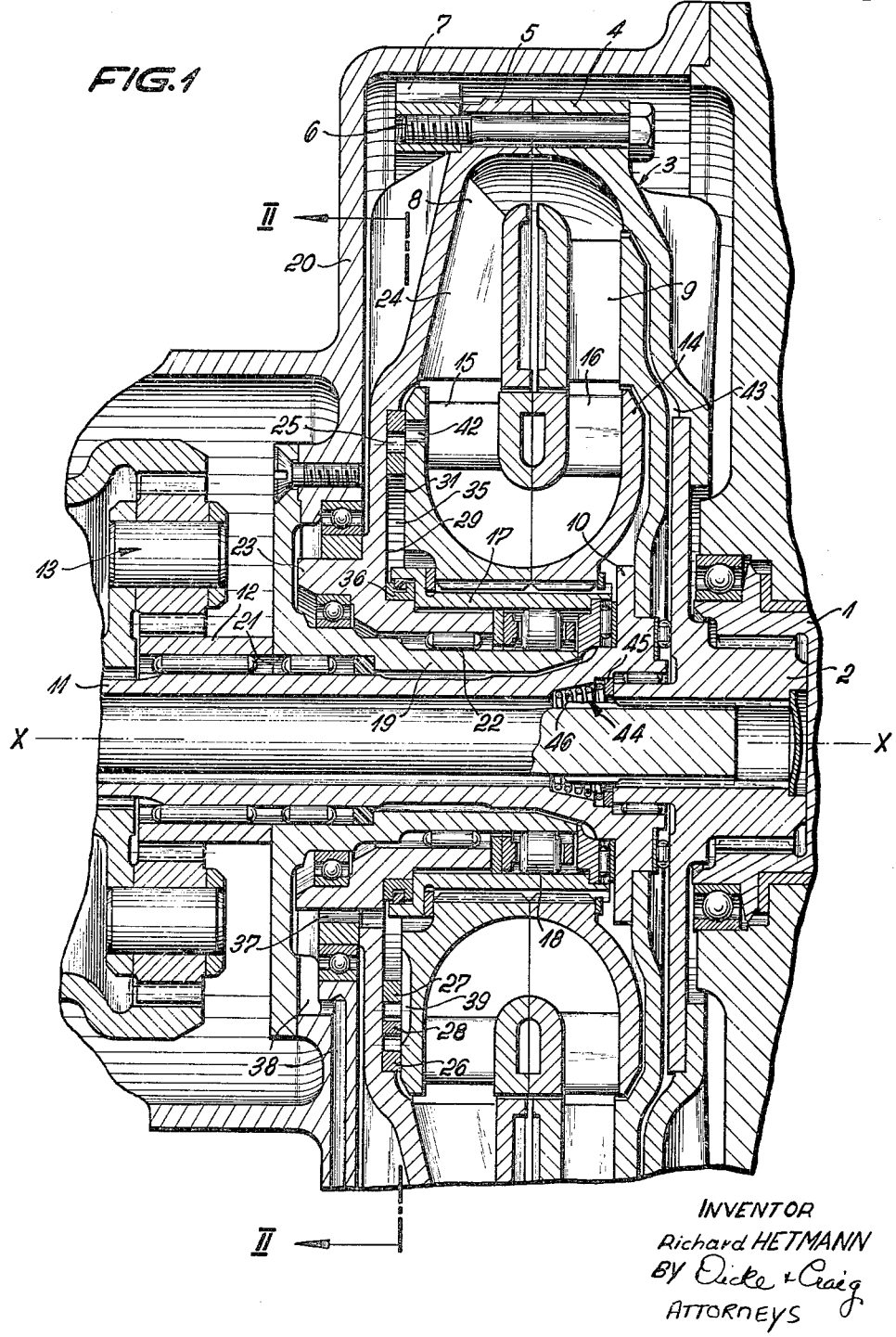

Oct. 19, 1965    R. HETMANN    3,212,264
HYDRODYNAMIC TRANSMISSION
Filed Oct. 9, 1963    2 Sheets-Sheet 1

INVENTOR
Richard HETMANN
BY Dicke & Craig
ATTORNEYS

Oct. 19, 1965  R. HETMANN  3,212,264
HYDRODYNAMIC TRANSMISSION
Filed Oct. 9, 1963  2 Sheets-Sheet 2

INVENTOR
Richard HETMANN
BY Dicke & Craig
ATTORNEYS

United States Patent Office 3,212,264
Patented Oct. 19, 1965

3,212,264
HYDRODYNAMIC TRANSMISSION
Richard Hetmann, Stuttgart-Weil im Dorf, Germany, assignor to Firma Dr. Ing. h.c. F. Porsche K.G., Stuttgart-Zuffenhausen, Germany
Filed Oct. 9, 1963, Ser. No. 314,999
Claims priority, application Germany, Nov. 2, 1962, P 30,492
1 Claim. (Cl. 60—54)

The present invention relates to a hydrodynamic transmission having a primary part and one or several secondary parts, in the fluid circulation of which is included a hydraulic pump.

In order to achieve a favorable efficiency with hydrodynamic transmissions and to compensate for leakage losses within the fluid circulation, it is already known in the prior art to supply liquid from an independently driven pump to the primary and secondary parts serving for purposes of torque conversion. The pump should thereby be so chosen and dimensioned that with a sufficiently large delivery, the hydraulic pressure within the fluid circulation, during starting of the transmission, that is, within the largest torque conversion range amounts to about 2.5 to 6.5 atmospheres absolute excess pressure. Since this pressure is no longer needed after reaching the so-called clutch or coupling point, that is with a torque conversion near unity, and substantially only leakage losses have to be compensated, pumps with a constant delivery rate supply within the last-mentioned operating phase excessive quantities so that the liquid has to be returned through valve sets into the suction space of the pump. The considerable power input for or energy dissipation in the pump is therefore over a large operating range of the transmission converted uselessly into undesired heating of the liquid which has to be compensated for by a separate cooler. In order to avoid these shortcomings, the use of multi-stage pumps has already been proposed heretofore which supply in dependence on the torque conversion with a decreasing number of pumps. The utilization of such types of pumps, however, considerably increase the cost of the transmission by reason of the complicated and multi-partite construction thereof and requires an additional control installation which, in turn, requires service and maintenance, is subject to failure and breakdowns and cannot be accommodated readily everywhere.

According to the present invention these disadvantages are avoided in that the hydraulic pump is driven in dependence on the relative rotational speed between a primary part and a secondary part of the transmission. It is achieved thereby that the pump output is adapted or matched proportionally to the prevailing power requirement so that every power loss and undesired heating of the liquid is avoided. The hydraulic pump comprises preferably a driving member and a driven member whereby the driving member is connected with the primary part and the driven member with the secondary part of the hydrodynamic transmission. The pump remains thereby in operation only as long as moments and therewith rotational speeds are converted within the hydrodynamic transmission. An interchange of the suction and pressure sides of the pump is impossible if the driven part of the liquid pump is held or supported by a one-way brake in a direction opposite to the normal direction of rotation of the driving part of the pump.

A favorable construction and arrangement of the pump is attained according to the present invention in hydrodynamic transmissions which include a pump wheel, a turbine wheel and at least one guide wheel, if the drive of the hydraulic pump supplying liquid to the torque converter space takes place in dependence on the relative rotational speed between the pump wheel and a guide wheel which is held or supported by a free-wheeling brake in a direction opposite to the normal direction of the pump wheel. Since the pump wheel rotates during the start with the input rotational speed of the transmission and the guide wheel is initially stationary, the pump supplies with maximum output under those conditions. At the coupling or clutch point the guide wheel, as is known, lifts off or disengages from the free-wheeling device and rotates approximately with the rotational speed of the pump wheel. The relative rotational speed thereby becomes nearly zero so that the hydraulic pump compensates with a small output only the leakage losses. The hydraulic pump is advantageously formed by a gear pump which is preferably arranged between a wall of the pump wheel and a wall of the guide wheel. The use of such a type of pump, known per se, entails the advantage of small dimensions and can therefore be accommodated in direct proximity to the primary and secondary part of the transmission so that the usual width of the transmission is maintained. A relatively simple construction of the pump requiring relatively few parts is achieved in that the outer ring gear of the gear pump is rigidly connected with the pump wheel coaxially to the axis of the hydrodynamic transmission whereas the inner ring gear which is held eccentrically to the outer ring gear is guided freely rotatably between the pump and guide wheels. The inner ring gear is in operative engagement over a part of its circumference with the outer ring gear and is under the influence of a filling or packing body which is secured at the guide wheel. A further considerable simplification is achieved thereby.

The liquid supply from the gear pump into the fluid circulation takes place advantageously through an aperture in the wall of the guide wheel. Separate guide means or conduits for the liquid on the pressure side of the pump can be dispensed with thereby. The return flow of the liquid takes place through a gap between the pump wheel and the turbine wheel against the effect of a relief valve responsive to a predetermined pressure whereby a predetermined liquid pressure is maintained within the hydrodynamic transmission. The relief valve consists in a simple manner of a spring-loaded disk which is arranged coaxially to the axis of the hydrodynamic transmission between the support of the pump wheel and the support of the turbine wheel. The liquid flowing back into the oil sump may, as is known, be made available in case of need for the lubrication of transmission parts in any conventional manner.

Accordingly, it is an object of the present invention to provide a hydrodynamic transmission system of the type described hereinabove which avoids by simple means the shortcomings and drawbacks encountered with the prior art constructions.

It is another object of the present invention to provide a hydraulic pump for use with a hydrodynamic device which is so constructed and arranged as to provide automatically a pump output ideally matched to the requirements of the torque converter.

Still another object of the present invention resides in the provision of a hydrodynamic transmission assembly which includes a hydraulic pump forming part of the transmission assembly, yet requires so little space that the usual width of the transmission can be maintained.

A still further object of the present invention resides in the provision of a hydrodynamic transmission assembly of which the hydraulic pump is so accommodated and arranged within parts of the hydrodynamic transmission as to assure a compact and simple construction.

A still further object of the present invention resides in the provision of the fluid circulation system for hydrodynamic transmissions, especially torque converters, which automatically controls the pump output in such a manner that the production of heat as a result of excess pump output as well as complicated valving and cooling structures are eliminated.

Still another object of the present invention resides in the provision of a pump for a hydrodynamic torque converter in which the pump output is so matched to the requirements of the hydrodynamic torque converter as to prevent unnecessary excessive outputs from the pumps and therewith to increase the efficiency of the installation.

Still a further object of the present invention resides in the provision of a hydrodynamic transmission system of the type described hereinabove which includes a hydraulic pump for the supply of liquid that is so controlled automatically as to adapt the pump output to the transmission requirements yet dispenses with complicated control devices, thereby obviating the need for service and maintenance of such control devices and eliminating the possibility of breakdowns due to failures.

A still further object of the present invention resides in the provision of a hydrodynamic torque converter-pump assembly which is simple in construction, eliminates the need for separate supply ducts from the pump to the torque converter space and assures service-free operation.

Figure 2:
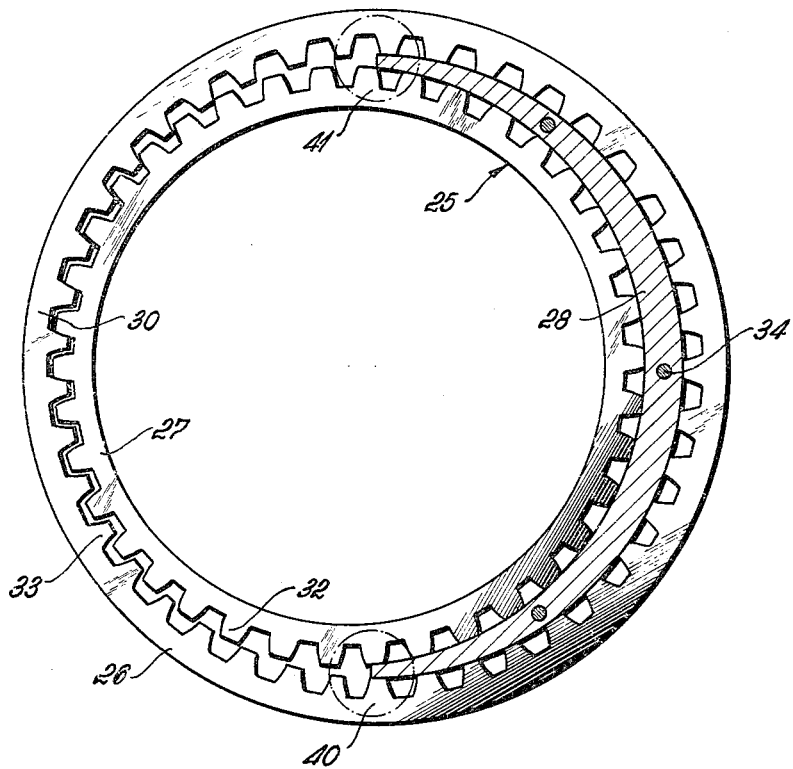

These and other objects, features and advantages of the present invention will become more obvious from the following description when taken in connection with the accompanying drawing which shows, for purposes of illustration only, one embodiment in accordance with the present invention, and wherein:

FIGURE 1 is a vertical longitudinal axial cross-sectional view through a part of a hydrodynamic torque converter for a motor vehicle with a drive means for the filling pump in accordance with the present invention, and FIGURE 2 is a cross-sectional view through the pump in accordance with the present invention, taken along line II—II of FIGURE 1.

Referring now to the drawing wherein like reference numerals are used throughout the two views to designate like parts, reference numeral 1 designates therein a crank shaft of an internal combustion engine of any conventional construction. The drive shaft 2 of a torque converter generally designated by reference numeral 3 is operatively connected with the crank shaft 1 by any suitable means such as a spline connection. The torque converter 3 includes a two-partite housing of which the housing halves 4 and 5 are connected with one another by bolts 6 distributed over the circumference, on which is also secured at the same time the starter gear 7 of the engine. The housing half 4 is secured to the drive shaft 2 whereas the housing half 5 forms the pump wheel of the torque converter provided with blades or vanes 8. The turbine wheel 9 of the torque converter is secured at a flange 10 of a hollow shaft 11 which extends coaxially to the driving or input shaft 2. The sun gear 12 of a planetary gear generally designated by reference numeral 13 and not illustrated in detail herein is arranged on the hollow shaft 11. The planetary gear 13 which forms part of a change-speed transmission is connected to the rear of the torque converter; the drive for the vehicle (not shown) is secured from the change-speed gear in any conventional manner. The torque converter 3 further comprises a guide wheel assembly 14 provided with blade or vane sets 15 and 16 which are supported by means of a common sleeve 17 on a stationary hollow support shaft 19 by the intermediary of a free-wheeling brake 18. The support shaft 19 is connected with the transmission housing 20 accommodating therein the torque converter 3 and the planetary gear 13. The support shaft 19 serves with the inner surfaces 21 thereof for the guidance of the hollow shaft 11 whereas the hub portion 23 of the pump wheel 5 is freely rotatably supported on the outside 22 thereof.

A gear pump generally designated by reference numeral 25 is provided for supplying liquid into the torque converter space 24. The gear pump 25 consists of an outer gear ring 26, an inner gear ring 27 as well as of a filler or packing body 28 (FIGURES 1 and 2). The outer gear ring 26 is inserted in a non-rotatable manner into a cylindrical aperture or recess 29 of the pump wheel 5 and is supported with a side surface 30 thereof against a wall portion 31 of the guide wheel 14 carrying the blade set 15. The inner gear ring 27 is arranged freely rotatably between a wall of aperture or recess 29 and the wall 31 of the guide wheel 14 and is held by means of the filling body 28 eccentrically to the axis of rotation X—X of the torque converter 3 in such a manner that the teeth 32 thereof are in meshing engagement over a part of the circumference with the teeth 33 of the outer gear ring 26. The filling body 28 is secured at the guide wheel 14 by means of pins 34 or the like. The space between the walls 29 and 31 forms an annular channel 35 which is sealed against the hub portion 23 of the pump wheel 5 by an elastic or springy sealing ring 36 and is in communication with the suction channel 38 of the pump by way of an aperture 37 provided in the hub portion 23. The suction channel 38 extends through the wall of the transmission housing 20 and terminates in the oil sump (not shown) of the torque converter 3. The annular channel 35 is in communication by way of a groove 39 provided in the wall 31 of the guide wheel 14 with the suction zone 40 of the pump 25 indicated in FIGURE 2. The liquid enters from the pressure zone 41 of the pump 25, disposed opposite the suction zone 40, through an aperture 42 provided in the guide wheel 14 directly into the space 24 of the torque converter 3. The return flow of the liquid takes place through a gap 43 between the turbine wheel 9 and the housing half 4 against the effect of a relief valve 44 which is arranged coaxially to the axis X—X between the support shaft 11 of the turbine wheel 9 and the drive shaft 2 of the torque converter 3. The relief valve 44 consists of a disk 45 closing the gap 43 which disk is held in the normally closed position thereof by a compression spring 46 that in turn is supported against the shaft 11.

If the pump wheel 5, 8 of the torque converter 3 is set into rotation by the drive shaft 2 and therewith the outer gear ring 26 of the pump 25 is also set into rotation, then the inner gear ring 27 is also taken along the circumferential direction. The liquid which enters during rotation of gears 26 and 27 through the suction channel 38 into the annular space 35 reaches the suction zone 40 of the pump by way of the groove 39 provided in the initially stationary guide wheel 14 and is pressed in the individual tooth gaps toward the pressure zone 41 from which it reaches the torque converter space 24 by way of the aperture 42 in order to flow, within the fluid circulation, past the blades or vanes 8 of the pump wheel 5, the turbine wheel 9 as well as the blade sets 15 and 16 of the guide wheel 14. The pump 25 is so constructed and dimensioned that the hydraulic pressure within space 24 amounts to approximately 2.5 atmospheres absolute excess pressure within the highest torque conversion range. If the torque conversion reaches the coupling or clutch point, then the guide wheel 14 is released by its brake 18 and rotates together with the pump wheel 5. As a result thereof, the relative rotational speed between the pump wheel 5 and the guide wheel 14 is eliminated so that both the outer gear ring 26 and the inner gear ring 27 of the pump 25 as well as the filling body 28 thereof rotate together with the aforementioned parts 5, 9 and 14 of the torque converter, whereby the output of the pump 25 drops to nearly zero. In this manner it is assured that the pump 25 operates only when an output requirement is present dependent on the torque converter. The same operational effect is also obtained if the members of the pump are arranged between the pump wheel and the turbine wheel.

While I have shown and described one embodiment in accordance with the present invention, it is understood that the same is not limited thereto but is susceptible of numerous changes and modifications within the spirit and scope thereof as known to a person skilled in the art. For example, the present invention is suitable not only for the particular type of torque converter illustrated herein but for any type of hydrodynamic torque converter as well as also for hydraulic couplings in which the primary side is connected with the driving engine and the secondary side with the transmission parts to be coupled to the engine.

Thus, it is obvious that the present invention is not limited to the details shown and described herein but is susceptible of numerous changes and modifications, and I therefore do not wish to be limited to the details shown and described herein but intend to cover all such changes and modifications as are encompassed by the scope of the appended claim.

I claim:

A hydrodynamic torque converter having impeller wheel means, turbine wheel means, and guide wheel means forming a toroidal fluid circuit,
- one-way brake means operable with stationary means for braking said guide wheel means against rotation in a direction opposite to the normal direction of rotation of said impeller wheel means,
- said impeller wheel means including a semi-toroidal shell having an inner annular recess and said guide wheel means having a wall portion adjacent said recess,
- a hydraulic pump means including an outer ring gear fixedly secured to said shell within said recess along the outer bounds thereof and in contact with said wall portion, said ring gear being substantially concentric with the axis of rotation of said impeller wheel means,
- said pump means further including a floating inner gear ring with outwardly extending teeth meshing in part with part of the teeth of said outer ring gear, said inner gear ring being disposed between said wall portion and a wall portion forming the bottom of the recess,
- arcuate filler means carried by said guide wheel means for separating the unmeshed portions of said gears and for guiding said inner gear ring for rotation between said first-named wall portion and said second-named wall portion and eccentrically to said outer ring gear,
- means providing a fluid inlet to said recess at one end of said arcuate filler means and means providing a fluid outlet leading to said toroidal fluid circuit from the other end of said arcuate filler means, whereby the output of said hydraulic pump means is proportional to the relative speeds of said impeller and guide wheel means.

References Cited by the Examiner

UNITED STATES PATENTS

| | | | |
|---|---|---|---|
| 2,168,863 | 8/39 | De Lavaud | 60—54 X |
| 2,232,101 | 2/41 | De Turk. | |
| 2,603,984 | 7/52 | Swift | 60—54 X |
| 2,638,746 | 5/53 | Kelley | 60—54 |

JULIUS E. WEST, *Primary Examiner.*